(12) United States Patent
Nielsen

(10) Patent No.: US 6,395,812 B1
(45) Date of Patent: May 28, 2002

(54) COMPOSITION

(75) Inventor: Bjarne Nielsen, Hovedgard (DK)

(73) Assignee: Danisco A/S, Copenhagen (DK)

( * ) Notice: Subject to any disclaimer, the term of this patent is extended or adjusted under 35 U.S.C. 154(b) by 0 days.

(21) Appl. No.: 09/063,973

(22) Filed: Apr. 21, 1998

(30) Foreign Application Priority Data

Feb. 25, 1998 (GB) .............................................. 9803982

(51) Int. Cl.[7] .............................. C08J 5/10; C08K 5/10; C08L 23/12
(52) U.S. Cl. ........................ 524/317; 524/310; 524/312; 524/318; 524/320; 524/322
(58) Field of Search ................................ 524/310, 312, 524/317, 318, 320, 322

(56) References Cited

U.S. PATENT DOCUMENTS

| | | | |
|---|---|---|---|
| 3,677,811 A | * 7/1972 | Kail | 117/138.8 E |
| 4,274,986 A | 6/1981 | Ikenaga et al. | 260/22 C |
| 4,647,609 A | 3/1987 | O'Brien | 524/267 |
| 5,756,567 A | 5/1998 | Rohrman | 524/232 |

FOREIGN PATENT DOCUMENTS

| | | |
|---|---|---|
| DE | 3310417 | 3/1983 |
| EP | 0 210 655 A2 | 2/1987 |
| EP | 0264270 | 10/1987 |
| EP | 0737712 | 4/1996 |
| GB | 1267348 | 3/1972 |
| GB | 2078760 | 6/1980 |
| JP | 61060775 | 3/1986 |
| JP | 213538 | * 9/1988 |
| JP | 08134289 | 5/1996 |

OTHER PUBLICATIONS

WPI Abstract Accession No. 96–075256[08] & JP 07033123 A (Lion Corp.) Dec. 19, 1995.
WPI Abstract Accession No. 89–352230[48] & JP 010263135 A (Marubishi) Oct. 19, 1989.
WPI Abstract Accession No. 73–28576[20] & JP 730014776 B (Taiyo).

* cited by examiner

Primary Examiner—James J. Seidleck
Assistant Examiner—U. K. Rajguru
(74) Attorney, Agent, or Firm—Frommer Lawrence and Haug, LLP; Thomas J. Kowalski; Samuel H. Megerditchian

(57) ABSTRACT

There is provided use of an anti-static composition for the manufacture of a polymer composition; wherein the anti-static composition comprising at least a first component and a second component; wherein the first or second component inhibits the crystallization of the other respective component; wherein at least the other respective component is an anti-static component; and wherein the anti-static composition is contacted with a polymer to form the polymer composition; with the proviso that if the anti-static composition consists solely of composition I and composition II, the anti-static composition is prepared by any one of: (i) integrated blending; or (ii) dry blending.

36 Claims, No Drawings

COMPOSITION

RELATED APPLICATIONS

Reference is made to U.K. application No. 9803982.2, filed Feb. 25, 1998, from which the present application claims priority, as well as to U.K. application No. 9803989.4, filed Feb. 25, 1998, and to the concurrently-filed U.S. application of Nielsen, Ser. No. 09/063,974. Each of these U.K. and U.S. applications is hereby incorporated herein by reference. Furthermore, in the following text, documents are cited. Each document cited in the following text, as well as each document cited in each document cited in the following text, is hereby incorporated herein by reference.

FIELD OF THE INVENTION

The present invention relates to a polymer composition comprising a polymer and an anti-static composition. In particular, the present invention relates to a polymer composition comprising a polymer and an anti-static composition, wherein the anti-static composition comprises at least two components having different properties relative to each other. The polymer composition may be used in packaging applications.

BACKGROUND OF THE INVENTION

Polymers have an extremely wide field of applications. In the food industry the use of polymers for the manufacture of food containers is important. In particular, polymers may be used to manufacture small food containers in which food products may be stored.

After the manufacture of food containers and the like, it is known that static charge may build up on the polymer surface. This static charge attracts dust and other fine particles. If such particles settle on a polymeric food container or similar packaging the container will appear dirty and will be less appealing to purchasers of the food. There is also the possibility of food contamination.

To overcome the problems of static build up on polymers in the food and other industries, anti-static (antistat) compositions have been provided. A good antistat composition dissipates or reduces static charge on a polymer over a long period. In the field of packaging, it is desirable that the antistat properties remain for the life time of the packaged product.

Antistat protection is typically obtained by incorporating an anti-static composition or compound into a polymer. The anti-static composition or compound may be incorporated into the polymer during the processing or production of the polymer, for example during the injection moulding of the polymer.

Conventional anti-static compositions of the prior art are distilled monoglycerides or mono-diglycerides derived from vegetable oils e.g. soya bean and rape seed, and animal fats. These anti-static compositions have been particularly recommended for incorporation into polypropylene and, in addition, have been particularly recommended for incorporation into injection moulded polymers.

Because of the derivation of the above conventional anti-static compositions they most commonly have a fatty acid profile that is a blend of palmitic ($C_{16}$) acid and stearic ($C_{18}$) acid.

A typical prior art teaching is provided by JP-A-01263135 which discloses polyolefins containing anti-static agents composed of $\geq 2$ $A^1OCH_2CH(OA^2)$—$CH_2OA^3$, wherein $A^{1-3}$=H,COR; R=$C_{9-21}$ alkyl or alkenyl, $\geq 1$ of $A^{1-3}$ is COR.

JP-A-08134289, JP-A-63213538, JP-A-63056545 and JP-A-07331230 disclose mixtures of glycerides and amine based compounds. These documents teach that these compositions have anti-static properties. To achieve their anti-static properties these compositions require the presence of the amine based compound. Legislation and consumer pressure provides that such amine based compounds should be present at low levels in food applications, or, if possible, completely excluded. However, the above prior art documents require the presence of amine based compounds to exhibit an anti-static effect.

The prior art anti-static compositions may provide acceptable results in some applications. However, in demanding applications, for example in the use of block copolymer polypropylene, the prior art anti-static compositions do not provide reliable results.

Furthermore, prior art antistats may also be disadvantageous because they may be incompatible with the polymer into which they are incorporated or with which they may be contacted. For example, the electronics industry commonly uses polycarbonates as a substrate and/or carrier for electronic components. However, nitrogen based or ionic anti-static compounds, which are commonly used, may corrode polycarbonate materials.

OBJECTS AND SUMMARY OF THE INVENTION

The present invention addresses the problems of the prior art anti-static compounds and compositions, namely their poor performance in use with some polymers and/or in some applications.

The present invention aims to overcome the problems of the prior art.

According to a first aspect of the present invention there is provided use of an anti-static composition for the manufacture of a polymer composition, e.g., the present invention can provide an anti-static composition, as well as a polymer composition including the anti-static composition; wherein the anti-static composition comprises at least a first component ("composition I") and a second component ("composition II"); wherein the first or second component inhibits the crystallisation of the other respective component; wherein at least the other respective component is an anti-static component; and wherein the anti-static composition is contacted with a polymer to form the polymer composition; with the proviso that if the anti-static composition consists solely of composition I and composition II, the anti-static composition is prepared by any one of: (i) integrated blending; or (ii) dry blending. Thus, the present invention also provides a method for preparing an anti-static composition comprising integrated or dry blending of compositions I and II, as well as a method for preparing the polymer composition comprising contacting the anti-static composition with the polymer to form the polymer composition.

Therefore, according to a second aspect of the present invention there is provided a method of preparing a polymer composition comprising the steps of a) providing an anti-static composition comprising at least a first component and a second component; wherein the first or second component inhibits the crystallisation of the other respective component; and wherein at least the other respective component is an anti-static component; and b) contacting the anti-static composition with a polymer to form the polymer composition; with the proviso that if the anti-static composition consists solely of composition I and composition II, the anti-static composition is prepared by any one of: (i) integrated blending; (ii) dry blending.

According to a third aspect of the present invention there is provided a polymer composition comprising: a polymer; and an anti-static composition; wherein the anti-static composition comprises at least a first component and a second component; wherein the first or second component inhibits the crystallisation of the other respective component; and wherein at least the other respective component is an anti-static component; with the proviso that if the anti-static composition consists solely of composition I and composition II the anti-static composition is prepared by any one of: (i) integrated blending; (ii) dry blending.

According to a fourth aspect of the present invention there is provided an integrated pellet comprising a polymer and an inventive anti-static composition; or, comprising an inventive polymer composition.

According to a fifth aspect of the invention, there is provided a container comprising an inventive polymer composition or comprising a polymer composition prepared in accordance with the methods or uses described herein.

These and other objectives and embodiments are disclosed or are obvious from and encompassed by the following Detailed Description.

DETAILED DESCRIPTION

As discussed above, the present invention entails, for instance, according to a first aspect, use of an anti-static composition for the manufacture of a polymer composition, e.g., the present invention can provide an anti-static composition, as well as a polymer composition including the anti-static composition; wherein the anti-static composition comprises at least a first component ("composition I") and a second component ("composition II"); wherein the first or second component inhibits the crystallisation of the other respective component; wherein at least the other respective component is an anti-static component; and wherein the anti-static composition is contacted with a polymer to form the polymer composition; with the proviso that if the anti-static composition consists solely of composition I and composition II, the anti-static composition is prepared by any one of: (i) integrated blending; or (ii) dry blending. Thus, the present invention also provides a method for preparing an anti-static composition comprising integrated or dry blending of compositions I and II, as well as a method for preparing the polymer composition comprising contacting the anti-static composition with the polymer to form the polymer composition.

Likewise, as discussed above, according to a second aspect, the present invention provides a method of preparing a polymer composition comprising the steps of a) providing an anti-static composition comprising at least a first component and a second component; wherein the first or second component inhibits the crystallisation of the other respective component; and wherein at least the other respective component is an anti-static component; and b) contacting the anti-static composition with a polymer to form the polymer composition; with the proviso that if the anti-static composition consists solely of composition I and composition II, the anti-static composition is prepared by any one of: (i) integrated blending; (ii) dry blending.

Similarly, as discussed above, according to a third aspect, the present invention provides a polymer composition comprising: a polymer; and an anti-static composition; wherein the anti-static composition comprises at least a first component and a second component; wherein the first or second component inhibits the crystallisation of the other respective component; and wherein at least the other respective component is an anti-static component; with the proviso that if the anti-static composition consists solely of composition I and composition II the anti-static composition is prepared by any one of: (i) integrated blending; (ii) dry blending.

The present invention overcomes the problems of the prior art by providing an anti-static composition which is effective over the lifetime or a substantial part thereof of a polymer article.

It will be appreciated that the use of antistat compositions of the present invention are not limited to the field of food packaging and accordingly the present application is not limited thereto. For example, the antistat compositions also have applications in, for example:

electronics industry—here the build up of static charges are to be avoided because of the damage which may be caused to electronic components e.g. semi-conductors by the discharge of the static charge;

aerospace industry—here build up static charge may attract dust/dirt and compromise delicate components automotive industry—here build of static charge may attract dust/dirt and detract from the appearance of vehicles and/or components thereof;

non-food packaging applications—for example, in the paint industry, build of static charge on a paint container may result in attraction of dust/dirt. The dust/dirt may contaminate the paint on introduction thereof into the container and/or may render the container unappealing to the purchaser;

extreme environments—here environments with aggressive, in particular explosive atmospheres are vulnerable to static charge build up. If a static charge discharges in an explosive atmosphere, detonation of the atmosphere may result.

In the present specification, the term "integrated blending" means blending the components when all the components are in the liquid phase.

In the present specification, the term "dry blending" means blending the components when at least one of the components is a phase other than the liquid phase.

The above aspects of the present invention are advantageous as they overcome the problems associated with the prior art.

In the present specification, composition I refers to a composition consisting of a distilled mono-glyceride prepared from edible, fully hydrogenated lard or tallow, the composition having the following specification:

| Monoester content | $\geq 90\%$ |
| Iodine value | $\leq 2$ |
| Free glycerol | $\leq 1\%$ |
| Free fatty acid (F.F.A.) | $\leq 1.5$ |
| Dropping point | approx. 70° C. |

In the present specification, composition H refers to a composition consisting of a distilled mono-glyceride prepared from edible, distilled, reaction product of lauric acid and glycerol, the composition having the following specification:

| Monoester content | ≧90% |
| --- | --- |
| Iodine value | ≦1 |
| Free glycerol | ≦1% |
| Free fatty acid (F.F.A.) | ≦1.5% |
| Dropping point | approx. 56° C. |

An anti-static composition contained in a polymer composition is believed to migrate to the surface of the polymer composition. At the surface the anti-static composition attracts water to the surface. The attracted water forms a conductive layer which dissipates static charge and/or prevents accumulation of static charge. We also believe that the properties of the anti-static compositions of the prior art are inhibited by the crystallisation of the composition at the surface of the polymer. Thus the problems of the prior art have been overcome in the present invention by providing an anti-static composition comprising at least a first component and a second component, wherein the first or second component inhibits the crystallisation of the other respective component and wherein at least the other respective component is an anti-static component Crystallisation of an anti-static component in an antistat applied to a polymer may also result in clouding or hazing of the polymer. The present invention is also advantageous in that by providing two components, wherein one of which inhibits the crystallisation of the other, clouding of the polymer may be reduced or prevented.

In the present specification, the term "contacted with a polymer" means that the anti-static composition is brought into contact with the polymer or is mixed and/or blended and/or integrated with the polymer and/or is incorporated into the polymer. The polymer composition containing the polymer and the anti-static composition may then, if necessary, be further processed, for example the polymer composition may be melted. Optionally the melt may be extruded and subsequently cooled.

The term "blending" with respect to contacting the anti-static composition with the polymer includes
  i) dry blending of the components to be blended, for example by mixing the components in a powdered form and, optionally, subsequently extruding them; and
  ii) dry blending the polymer in a pellet form with the anti-static composition, for example by mixing the polymer and anti-static composition in a pellet and a powdered form, respectively and, optionally, subsequently extruding them.

In a preferred embodiment the anti-static composition and polymer are integrated. This may be achieved by melting the polymer and/or the anti-static composition and combining the polymer and anti-static composition. Optionally, the melt of the two materials may be extruded. In a preferred embodiment the integrated product is in a pellet form.

Thus, according to a fourth aspect of the present invention there is provided an integrated pellet comprising a polymer, and an anti-static composition.

Preferably, a container comprising a polymer composition in accordance with the present invention exhibits anti-static properties within 24 hours of its date of manufacture and maintains those properties for a prolonged period—such as for at least 5 days, preferably at least 10 days, preferably at least 14 days, preferably at least 20 days, preferably at least 40 days, preferably at least 60 days, preferably at least 80 days, preferably at least 100 days, preferably at least 150 days, preferably at least 200 days. Such a container, or indeed any other polymer article comprising the polymer composition, avoids the build up of static charge during the manipulation and/or treatment and/or shipping of the container. This is advantageous because a static charge may attract dust which would, for example,
  reduce the adherence of a label which is to be applied further down a production line;
  be incorporated into or entrappsed by a subsequently applied print or paint layer and be visible through the layer; or
  pollute the inside of the container.

By the term "exhibits anti-static properties" we mean that when the polymer composition is in the form of a plaque having a thickness of 1.0 mm and contains 0.6 wt % of anti-static composition based on the total weight of the polymer composition, the polymer composition has a measurable static delay time when measured in accordance with the Static Delay Time Protocol given in the Examples.

Thus according to a fifth aspect of the present invention there is provided a container comprising a polymer composition described above or comprising a polymer composition prepared in accordance with a method or use described above.

Preferably, the polymer is selected from polymerisation or copolymerisation products of monomers selected from those disclosed in U.S. Pat. No. 5,679,816, namely ethylenically and/or acetylenically unsaturated monomers having from 2 to 20 carbon atoms. Preferred monomers of those disclosed include $C_{2-10}$ alpha-olefins including ethylene, propylene, isobutylene, 1-butene, 1-hexene, 4-methyl-1-pentene, and 1-octene. Other preferred monomers include carbonates, α-olefin rubber, butadiene, ethyleneterephthalate, vinylchloride, ethylene propylene rubber (EPR), acrylonitrile, vinylcyclohexene, vinylcyclohexane, styrene, $C_{1-4}$ alkyl substituted styrene, tetrafluoroethylene, vinylbenzocyclobutane, ethyl-idenenorbornene, piperylene, 1,4-hexadiene, methyl-1,4-hexadiene and 7-methyl-1,6-octadiene, derivatives and mixtures thereof. Thus, the polymer can be a polyethylene, such as low density polyethylene (LDPE), linear low density polyethylene (LLDPE), ultra low density polyethylene (ULDPE), very low density polyethylene (VLDPE), high density polyethylene (HDPE), e.g., an HDPE homopolymer, single site catalyst polyethylene (SSCPE); or, polypropylene, such as a polypropylene block copolymer or oriented polypropylene, and the like.

Preferably, the polymer is selected from polymerisation and copolymerisation products of propylene, α-olefin rubber, styrene, derivatives and mixtures thereof.

Preferably, the polymer is a thermoplastic polyolefin (TPO). TPOs have extensive applications, in particular in the automotive industry.

The polymer may be any form of polymer. The term polymer includes but is not limited to, homopolymers, copolymers, such as for example, block, graft, random and alternating copolymers, terpolymers, etc. and blends and modifications thereof. Furthermore, the term polymer includes all possible geometrical configurations of the polymer. These configurations include, but are not limited to isotactic, syndiotactic and atactic i.e. random symmetries.

Preferably, the polymer is a copolymer. Preferably, the monomer constituents of the copolymer are selected from the monomer units listed above. The copolymer may be a random copolymer, a branched copolymer or a block copolymer (sometimes referred to as a impact copolymer or a heterophasic copolymer). Preferably, the copolymer is a block copolymer.

Preferred copolymers include copolymers of ethylene and 1-butene; ethylene and 1-hexene; ethylene and 1-octene;

styrene and acrylonitrile; styrene, acrylonitrile and butadiene; high impact styrene and acrylonitrile; high impact styrene, acrylonitrile and butadiene.

Preferably, the copolymer includes monomer units selected from propylene, ethylene propylene rubber (EPR), acrylonitrile, styrene, derivatives and mixtures thereof. In a particularly preferred embodiment the polymer is polypropylene block copolymer.

The polymer may be copolymer of propylene and ethylene. The polymer may be a copolymer comprising at least 70 wt % propylene and no more than 30 wt % ethylene. The polymer may be a copolymer comprising propylene and no more than 40 wt % EPR.

The polymer may be a mixture of the polymerisation or copolymerisation products of any of the above monomers.

In the present specification reference has been made to polymers and to polymer compositions comprising anti-static compositions. In addition, the present invention also encompasses polymerisable compositions which comprise the respective monomers and monomer compositions comprising anti-static compositions. Such polymerisable compositions comprising anti-static compositions could be polymerised to obtain the respective polymers or polymer compositions referred in the present specification.

The anti-static composition of the present invention may comprise any compound or mixture of compounds provided the anti-static composition meets the criteria of the present invention as described above.

The at least two components of the anti-static composition may be discrete from each other. Alternatively, the two components may be linked. In this latter embodiment, the two components may be two constituents of the same compound.

Preferably, the at least two components of the anti-static composition are discrete from each other.

When the at least two components of the anti-static composition are discrete from each other, the at least two components may be obtained from a common source material. The common source material may be selected from coconut oil, palm kernel oil including Babassu oil, Cohune oil, Murumuru oil, Ouricuri oil and Tucum oil, mixtures and derivatives thereof.

Preferably, the common source material contains at least two glycerides having different fatty acid chain lengths. More preferably, the at least two glycerides having different fatty acid chain lengths which differ in length by at least two carbons, yet more preferably by at least four carbons. Suitable common source materials include coconut oil, palm kernel oil including Babassu oil, Cohune oil, Murumuru oil, Ouricuri oil and Tucum oil, butterfat, herring oil, menhaden oil, mixtures and derivatives thereof When the at least two components of the anti-static composition are discrete from each other, the at least two components may be combined by blending.

The term "blending" with respect to combining the at least two components includes i) dry blending of the components to be blended, for example by mixing the components in a powdered form;

ii) spray blending, for example by blending the components in a fluid form and subsequent spraying. This may be achieved by melting of the components or by dissolving them or suspending them in a carrier material;

iii) blending and milling of the components to be blended;

iv) blending and flaking of the components to be blended;

v) forming the components into pellets on a cooling band;

vi) integrating the components. This may be achieved by providing each of the components in fluid form, preferably in a liquid form, and mixing the components. The mixed components may optionally be cooled;

vii) any combination of i) to vi) above;

viii) optionally treating the product after any one of i) to vii) above to form a liquid, block, powder, pellet or flake.

In the above blending processes the components may each be in any one of the following forms, independently of each other: liquid, block, powder, pellet and flake.

Preferably, each of the two components of the anti-static composition are independently selected from monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain A length of 12 carbons including the reaction product of glycerol and lauric acid (preferably the lauric acid is obtained from coconut oil, palm kernel oil including Babassu oil, Cohune oil, Murumuru oil, Ouricuri oil and Tucum oil), monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, including lard and tallow, vegetable oils including rape seed oil, soya bean oil, palm oil, mixtures and derivatives thereof.

Preferably, the first component is selected from monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons including the reaction product of glycerol and lauric acid, mixtures and derivatives thereof. Preferably the lauric acid is obtained from coconut oil, palm kernel oil including Babassu oil, Cohune oil, Murumuru oil, Ouricuri oil and Tucum oil, mixtures and derivatives thereof.

Preferably, the second component is selected from monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, including lard and tallow, vegetable oils including rape seed oil, soya bean oil, palm oil, mixtures and derivatives thereof.

Preferably, the first component and/or the second component is at least a glycerol ester (i.e. a glyceride) preferably, each of the first component and the second component is at least a glyceride.

More preferably, the first component and/or the second component is at least a monoglyceride. Yet more preferably, each of the first component and the second component is at least a monoglyceride.

In a further preferred embodiment the first component is a monoglyceride having a fatty acid chain length of 8 carbons and/or a monoglyceride having a fatty acid chain length of 10 carbons and the second anti-static component is a monoglyceride having a fatty acid chain length of 14 carbons. In a further preferred embodiment the first component is a monoglyceride having a fatty acid chain length of 12 carbons and the second anti-static component is a monoglyceride having a fatty acid chain length of 18 carbons.

When a glyceride is utilised as the anti-static component, crystallisation may be prevented/inhibited by providing a component which prevents the glyceride from switching from α-form to β-form. Such a component may be selected from the class of products known as α-tending products. Thus in a preferred embodiment, the anti-static component is a glyceride, more preferably a mono-glyceride, and the crystallisation inhibiting component is an ax-tending product.

Preferably, the α-tending product is selected from propylene glycol esters, for example GRINSTED PGMS SPV™ available from Danisco Ingredients, Denmark, polyglycerol esters, for example GRINSTED PGE 55™ available from Danisco Ingredients, Denmark, mixtures and derivatives thereof.

Preferably, the first component comprises at least 15 wt % of the anti-static composition. Preferably, the first component comprises at least 20 wt % of the anti-static composition.

Preferably, the second component comprises at least 30 wt % of the anti-static composition. Preferably, the second component comprises at least 40 wt % of the anti-static composition.

Preferably, the anti-static composition comprises at least 20 wt % of the first component. More preferably, the anti-static composition comprises at least 30 wt %, more preferably at least 50 wt % of the first component.

Preferably, the anti-static composition comprises at least 20 wt % of the second component. More preferably, the anti-static composition comprises at least 30 wt %, more preferably at least 50 wt % of the second component.

In a preferred embodiment the anti-static composition comprises 35 wt % of the first component and 65 wt % of the second component or vice versa. In yet another preferred embodiment the anti-static composition comprises 50 wt % of the first component and 50 wt % of the second component.

In the process or use of the present invention the anti-static composition may be contacted with the polymer by first combining the anti-static composition with a first polymer to form a polymer master batch composition. Preferably, the anti-static composition comprises at least 5 wt % of the polymer master batch composition. The polymer master batch composition is then combined with a second polymer and the mixture treated to form the polymer composition. Preferably, the polymer composition so formed is substantially homogenous.

The first polymer and the second polymer may be the same.

Preferably the polymer composition is substantially homogenous.

By "substantially homogenous" it is meant that for any part of the polymer composition comprising x wt % thereof, that part of the polymer composition contains x±0.2x wt % of the total amount of a given component of the polymer composition. Preferably, that part of the polymer composition contains x±0.1x wt % of the total amount of the given component. More preferably, that part of the polymer composition contains x±0.05x wt % of the total amount of the given component. Yet more preferably, that part of the polymer composition contains x±0.02x wt % of the total amount of the given component.

Preferably, the given component of the polymer composition is the anti-static composition.

Polymers are prepared by polymerising one or more types of polymerisable monomers, such as by emulsion polymerisation, solution polymerisation, suspension polymerisation, gas phase polymerisation or bulk polymerisation.

The monomer(s) may be polymerised in the presence of optional ingredients such as any one or more of emulsifiers, stabilisers, anti-oxidants, surface active agents, slip agents, further anti-static compositions, initiators (such as photoinitiators), inhibitors, dispersants, oxidising agents, reducing agents, viscosity modifiers, catalysts, binders, activators, accelerators, tackifiers, plasticizers, saponification agents, chain transfer agents, cross-linking agents, surfactants, fillers, pigments, dyes, metal salts, solvents, mixtures and derivatives thereof. The optional ingredients listed above that can be used in the present invention may be any of those commonly used in the art.

Alternatively and/or in addition an optional ingredients may be contacted with/added to the polymer after polymerisation. Suitable optional ingredients include any one or more of emulsifiers, stabilisers, acid scavenger, anti-oxidants, surface active agents, slip agents, further anti-static compositions, dispersants, viscosity modifiers, tackifiers, plasticizers, surfactants, fillers, pigments, dyes, metal salts, solvents, mixtures and derivatives thereof. The optional ingredients listed above that can be used in the present invention may be any of those commonly used in the art.

Preferably, the anti-oxidant is a phenolic anti-oxidant.

Preferably, the acid scavenger is calcium stearate or calcium lactate.

By way of example, the surfactants and dispersants can be salts of fatty rosin and naphthenic acids, condensation products of naphthalene sulphonic acid and formaldehyde of low molecular weight, carboxylic polymers and copolymers of the appropriate hydrophile-lipophile balance, higher alkyl sulphates, such as sodium lauryl sulphate, alkyl aryl sulfonates, such as dodecylbenzene sulfonate, sodium or potassium isopropylbenzene sulfonates or isopropylnaphthalene sulfonates; sulfosuccinates, such as sodium dioctylsulfosuccinate alkali metal higher alkyl sulfosuccinates, e.g. sodium octyl sulfosuccinate, sodium N-methyl-N-palmitoyl-taurate, sodium oleyl isethionate, alkali metal salts of alkylarylpolyethoxyethanol sulfates or sulfonates, e.g.. sodium t-octylphenoxy-polyethoxyethyl sulfate having 1 to 5 oxyethylene units. Typical polymerisation inhibitors that can be used include hydroquinone, monomethyl ether, benzoquinone, phenothiazine and methylene blue.

A better understanding of the present invention, and of its many advantages, will be had from the following Examples, given by way of illustration.

EXAMPLES

The anti-static compositions of the present invention can be readily formulated from compounds and compositions which are commercially available. For example, an anti-static composition in accordance with the present invention could be formulated by mixing DIMODAN PV™ (available from Danisco Ingredients, Denmark) and a distilled monoglyceride based on hardened coconut oil having the following composition

| | |
|---|---|
| Monoglyceride content | 95.0 wt % |
| Glycerol content | 0.8 wt % | and the following fatty acid profile

| | Relative wt % |
|---|---|
| C8 | 13.9 |
| C10 | 7.6 |
| C12 | 49.9 |
| C14 | 16.2 |
| C16 | 6.5 |
| C18 | 5.3 |
| C18:1 | 0.5 |

Methods of producing monoglycerides are well known in the art. For example, teachings regarding the production and properties of monoglycerides are disclosed in Bailey's Industrial Oil and Fat Products, 5th Edition, Vol. 4 (Edible Oil and Fat Products: Processing Technology), pp 572–598, published by John Wiley & Sons, Inc. and Fatty Acids in Industry, pp 354-, published by Marcel Dekker, Inc. In this regard, mention is also made of Lauridsen, "Food Surfactants, Their Structure And Polymorphism," Technical Paper TP 2-1e, published by Danisco Ingredients, Edwin Rahrs Veg 38 DK-8220 Brabrand, Denmark; Krog, "Interactions of Surface-Active Lipids With Water, Protein, and Starch Components in Food Systems," Technical Paper TP 3-1e, published by Danisco Ingredients, Edwin Rahrs Veg 38 DK-8220 Brabrand, Denmark; Barfod, "The Influence of Emulsifiers and Hydrocolloids on Fat Crystallization and Water Binding in Various Food Systems," Technical Paper TP 4-1e, published by Danisco Ingredients, Edwin Rahrs Veg 38 DK-8220 Brabrand, Denmark; and Krog, "Dynamic and Unique Monoglycerides," Technical Paper TP 8-1e, published by Danisco Ingredients, Edwin Rahrs Veg 38 DK-8220 Brabrand, Denmark.

A polymer for use in accordance with the present invention will of course be chosen to suit the application in which the polymer composition is to be used. Thus, the polymer may be obtained from any of the commercial sources known to a person skilled in the art or synthesised according to any route. For example, polypropylene may be obtained from Epsilon Inc., U.S.A. under the trade name Epsilon IE-2135. Alternatively, polypropylene may be prepared in accordance with the teaching of Kirk-Othmer, Encyclopedia of Chemical Technology, 4th Edition, Vol. 17, pp 784–819.

The anti-static composition and the polymer may be formed into a polymer composition in accordance with the present invention by any suitable method. Some suitable methods such as blending are described above. Typically, the anti-static composition and polymer will be mixed and then the mixture will then be moulded to form a polymer composition having a required final shape.

Moulding, comprises melting or plasticising a polymeric material which is then forced into a mould. After solidification the polymeric material is removed. The process consists of three basic operations:

(1) raising the temperature of the polymer to a point where it will flow under pressure into the mould cavity, (2) allowing the polymer to solidify in the mould (conventionally referred to as hold time) while maintaining pressure during removal of heat, and (3) opening the mould to eject the polymer which is in the shape of the mould cavity.

Methods of moulding polymer compositions are known in the art. A method of moulding polypropylene is described in International Standard, ISO 294 [Reference No. ISO 294: 1995(E)], *Plastics—Injection Moulding of Test Specimens of Thermoplastic Material.* Other methods are known for example from U.S. Pat. Nos. 5,554,668; 5,510,075; and 5,685,451.

One skilled in the art will appreciate that other moulding methods can be used. The following anti-static composition were used to prepare compositions in accordance with the present invention and comparative compositions:

TABLE 1

| Component | |
|---|---|
| A | DIMODAN PV ™ a distilled monglyceride based on vegetable oil containing ≥90% monoglyceride |
| B | DIMODAN ML90 ™ a distiiled monoglyceride based on lauric acid ($C_{12}$) containing ≥90% monoglyceride |
| C | Distilled monoglyceride based on coconut oil containing ≥90% monoglyceride |
| D | GRINSTED MONO-DI HA 40 ™ a mono-diglyceride based on edible fats and oils containing~45% mono-glyceride |
| E | GRINSTED MONO-DI HV 60 ™ a mono-diglyceride based on vegetable oil containing~65% mono-glyceride |
| F | Animal Fat |
| G | GRINSTED PGMS ™ a propylene glycol ester |

The anti-static compositions to be tested were incorporated into a polymer composition in a two step process described below at concentrations ranging from 0.3–1.0 wt %, based on the total weight of the polymer composition.

The two step process comprised a first step of dry mixing each anti-static composition with virgin polymer resin which was then extruded in a Brabender DSK 42/6 twin-screw compounder to obtain a master batch polymer composition with an anti-static composition concentration of 1.0%.

Working samples containing the different concentrations at which each anti-static composition was tested were then prepared by dry mixing an appropriate amount of the master batch polymer composition with virgin polymer resin. The resulting dry mixed products were extruded in a Brabender DSK 42/6 twin screw compounder to ensure proper incorporation and a substantially homogenous dispersion of the anti-static composition in the polymer composition. Thus the final anti-static composition concentrations were at the desired test levels.

In the compounding steps described above the temperature profile in the Brabender DSK 42/6 twin screw compounder was fixed at 220° C. The screw speed was set at 75 rpm.

The prepared polymer compositions having the required concentration of anti-static composition were then injection moulded into plaques having approximate dimensions of 75×75×1.0 mm. The injection moulding was performed on a Boy 25M injection moulding machine at (having a clamp pressure of 25 tons). The temperature profile was set at 185, 200 and 210° C. with a nozzle temperature of 210° C. The mould temperature was set at 40° C. The total cycle time was 22 seconds with a cooling time of 15 seconds.

The antistat properties of the injection moulded plaque was evaluated after 1, 3, 7, 14, 28, 56, 112, 224, and 448 days of storage.

Plaques were stored at ambient conditions through out the entire test period. The antistat properties were determined in accordance with the Static Decay Time (SDT) Protocol described below.

Static Decay Time (SDT) Protocol

SDT data are recorded with an Electrotech Systems Static Decay meter, model 406C, equipped with a humidity chamber. The humidity chamber ensures proper conditioning of samples prior to the testing. Conditioning for 24 hours at 22±2° C. and 52±2% relative humidity is required.

A voltage of a ±5 kV is applied to the sample and when the sample surface has reached full charge at 5 kV, the power supply is cut off. The time, measured in seconds, for the accepted charge to dissipate to 10% (500 V) of its original value, is recorded.

This procedure is to be repeated for a total of three samples and for each the SDT is measured three times at +5 kV and three times at −5 kV. The eighteen individual time measurements obtained are averaged to give a single SDT measurement.

If any of the 18 measurements required to determine the SDT failed to produce a result due to lack of performance, this was recorded. Such records are marked * in the tables below. Such an inconsistent result may be interpreted to indicate less attractive performance.

Excellent antistat protection is indicated by an SDT of below 1 second. SDT of 1–5 seconds indicate an acceptable antistat protection. If the SDT is above 10 seconds the antistat added to the polymer is unlikely to provide a sufficient performance in demanding applications such as food packaging.

EXAMPLES 1–8

A block copolymer polypropylene supplied by Epsilon, USA under the commercial name Epsilon IE-2135 was evaluated. This polymer is characterised as a 35 melt flow resin with medium impact.

The results of this evaluation are shown in Table 2 below.

TABLE 2

| Ex. | Component (Ratios) | Antistat Conc. % | Day 1 | Day 3 | Day 7 | Day 14 | Day 28 | Day 56 | Day 112 | Day 224 | Day 448 |
|---|---|---|---|---|---|---|---|---|---|---|---|
| 1 | A (100) | 0.30 | nef | 0.1* | 0.2 | nef | 3* | nef | 0.6* | nef | nef |
|  | A (100) | 0.50 | nef | nef | 1 | nef | 0.01* | nef | nef | nef | nef |
|  | A (100) | 0.60 | 0.2* | 0.5 | 0.4 | 1.6* | 0.3* | 1.1* | 0.1* | nef | nef |
|  | A (100) | 1.00 | nef | 0.2* | 0.7* | 1.6 | 0.7* | 0.2* | 0.6* | nef | nef |
| 2 | B (100) | 0.60 | 33 | 4* | 2* | 1.1 | nef | nef | nef | nef | nef |
|  | B (100) | 0.80 | 0.3 | 0.3 | 0.3 | 0.3 | 0.7 | nef | nef | nef | nef |
|  | B (100) | 1.00 | 0.2 | 0.3 | 0.2 | 2.0 | 0.5 | nef | nef | nef | nef |
| 3 | D (100) | 0.20 | nef |  | nef | nef | nef | nef | nef | nef | nef |
|  | D (100) | 0.40 | nef |  | nef | nef | nef | nef | nef | nef | nef |
|  | D (100) | 0.60 | nef |  | nef | nef | nef | nef | nef | nef | nef |
|  | D (100) | 0.80 | nef | nef | nef | nef | nef | nef | nef | nef | nef |
|  | D (1100) | 1.00 | nef | nef | nef | nef | nef | nef | nef | nef | nef |
| 4 | E (100) | 0.20 | nef |  | nef | nef | nef | nef | nef | nef | nef |
|  | E (100) | 0.40 | nef |  | nef | nef | nef | nef | nef | nef | nef |
|  | E (100) | 0.60 | nef |  | nef | nef | nef | nef | nef | nef | nef |
|  | E (100) | 0.80 | nef | nef | nef | nef | nef | nef | nef | nef | nef |
|  | E (100) | 1.00 | nef | nef | nef | nef | nef | nef | nef | nef | 1.7* |
| 5 | A + B (65:35) | 0.30 | nef | nef | 0.5* | 0.1* | 12* | 0.9 | 0.3* | 0.4* | nef |
|  | A + B (65:35) | 0.50 | nef | 0.2 | 0.3 | 1.1 | 0.6 | 0.8* | 0.3 | 2.5 | 0.7* |
|  | A + B (65:35) | 0.60 | 0.3 | 0.1 | 0.0 | 0.1 | 0.1 | 0.1* | 0.1 | 0.2 | nef |
|  | A + B (65:35) | 0.80 | 0.2 | 0.1 | 0.0 | 0.1 | 0.1 | 0.1 | 0.2 | 0.2 | nef |
|  | A + B (65:35) | 1.00 | 0.1 | 0.1 | 0.1 | 0.2 | 0.1 | 0.2 | 0.2 | 0.3 | nef |
| 6 | A + B (50:50) | 0.30 | 0.3* | 0.3* | 0.2 | 0.7 | 0.4 | 9.0 | 0.9* | nef | nef |
|  | A + B (50:50) | 0.50 | 0.6* | 0.4 | 0.2 | 0.5 | 0.3 | 0.3 | 0.3 | nef | nef |
|  | A + B (50:50) | 0.60 | 0.3 | 0.1 | 0.1 | 0.1 | 0.1 | 0.1 | 0.2 | 0.3 | nef |
|  | A + B (50:50) | 0.80 | 0.2 | 0.1 | 0.1 | 0.1 | 0.2 | 0.2 | 0.3 | nef | 2.6* |
|  | A + B (50:50) | 1.00 | 0.1 | 0.1 | 0.2 | 0.2 | 0.2 | 0.2 | 0.3 | 0.7* | 1.0* |
| 7 | A + C (65:35) | 0.30 | nef | nef | 0.5* | 0.1* | 12* | 0.9 | 0.3* | 0.4* | nef |
|  | A + C (65:35) | 0.50 | nef | 0.2 | 0.3 | 1.1 | 0.6 | 0.8* | 0.3 | 2.5 | 0.7* |
|  | A + C (65:35) | 0.60 | 0.3 | 0.1 | 0.0 | 0.1 | 0.1 | 0.1* | 0.1 | 0.2 | nef |
|  | A + C (65:35) | 0.80 | 0.2 | 0.1 | 0.0 | 0.1 | 0.1 | 0.1 | 0.2 | 0.2 | nef |
|  | A + C (65:35) | 1.00 | 0.1 | 0.1 | 0.1 | 0.2 | 0.1 | 0.2 | 0.2 | 0.3 | nef |
|  | A + C (50:50) | 0.30 | 0.3* | 0.3* | 0.2 | 0.7 | 0.4 | 9.0 | 0.9* | nef | nef |
|  | A + C (50:50) | 0.50 | 0.6* | 0.4 | 0.2 | 0.5 | 0.3 | 0.3 | 0.3 | nef | nef |
|  | A + C (50:50) | 0.60 | 0.3 | 0.1 | 0.1 | 0.1 | 0.1 | 0.1 | 0.2 | 0.3 | nef |
|  | A + C (50:50) | 0.80 | 0.2 | 0.1 | 0.1 | 0.1 | 0.2 | 0.2 | 0.3 | nef | 2.6* |
|  | A + C (50:50) | 1.00 | 0.1 | 0.1 | 0.2 | 0.2 | 0.2 | 0.2 | 0.3 | 0.7* | 1.0* | nef - no antistat effect
* - results which are inconsistent/notreproducible

Example 1 provided some performance at a concentrations of 0.6–1.0 wt %. However, it failed to match the antistat properties obtained by any of Examples 5 to 8 this concentration.

At concentrations of 0.3–0.5 wt % the antistat properties of Example 1 can not be regarded consistent and reliable. The anti-static properties of this comparative Example 1 do not match the antistat properties of any of Examples 5 to 8.

Examples 2 provided either no anti-static protection or when exhibited it was variable and could not be relied upon. It is particularly noted that Examples 3 and 4 completely failed to provide an anti-static effect.

As discussed above Examples 5 and 7, in accordance with the present invention, exhibited very good antistat properties at a comparatively low concentration, for example at 0.3 wt %. It is possible to obtain an immediate antistat effect an anti-static composition concentration of 0.3–0.6 wt % and a good performance remains throughout a period of 224 days.

Examples 6 and 8, in accordance with the present invention, exhibited very good antistat properties at a comparatively low concentration, for example at 0.3 wt %. It is possible to obtain an immediate antistat effect an anti-static composition concentration of 0.3–0.6 wt % and a good performance remains throughout a period of 112 days.

Thus it can be concluded that a 65/35 blend of two components (Examples 5 and 7) has a tendency to work well for a longer period of time than a 50/50 blend (Examples 6 and 8). A 50/50 blend, on the other hand, has a somewhat better initial performance at a 0.3–0.5% concentration than the 65/35 blend.

A person skilled in the art will appreciate that the differences which can be observed between the two blend ratios does not indicate that either of the two blends is significantly better than the other. On the contrary, these different properties allow for one to adapt the performance of the anti-static composition depending on the application in which it is used.

The anti-static compositions of the present invention exhibited an overall improved antistat performance when compared to the comparative examples above. Conventional anti-static compositions such as those of Examples 1 to 4 provided poor anti-static properties.

EXAMPLES 10–15

(There is no Example 9 due to an inadvertent numbering error.) A high density polyethylene homopolymer (available under the name Alathon H 5265 from the US company Lyondell, which now trades under the name Equastar) was evaluated. The results of this evaluation are show in Table 3 below.

TABLE 3

| Ex. | Component (Ratios) | Antistat Conc. % | Day 1 | Day 3 | Day 7 | Day 14 | Day 28 | Day 56 | Day 112 | Day 224 |
|---|---|---|---|---|---|---|---|---|---|---|
| 10 | A (100) | 0.70 | nef | 0.9* | Nef | nef | nef | nef | nef | nef |
|  | A (100) | 0.75 | nef | nef | Nef | nef | nef | nef | nef | nef |
|  | A (100) | 1.00 | 0.6 | 0.9 | 0.5 | 0.9 | 0.0 | nef | nef | nef |
| 11 | B (100) | 0.50 | nef | nef | Nef | nef | nef | nef | nef | nef |
|  | B (100) | 0.75 | 0.4 | nef | Nef | nef | nef | nef | nef | nef |
|  | B (100) | 1.00 | 0.3 | nef | Nef | nef | nef | nef | nef | nef |
| 12 | D (100) | 0.50 | nef | nef | Nef | nef | nef | nef | nef | nef |
|  | D (100) | 1.00 | nef | nef | Nef | nef | nef | nef | nef | nef |
| 13 | A + B (50:50) | 0.50 | nef | nef | Nef | nef | nef | nef | nef | nef |
|  | A + B (50:50) | 0.70 | nef | nef | Nef | nef | nef | nef | nef | nef |
|  | A + B (50:50) | 1.00 | 0.5 | 0.5 | 0.4 | 0.8 | 0.4 | 1.4 | nef | nef |
| 14 | A + C (50:50) | 0.50 | nef | nef | Nef | nef | nef | nef | nef | nef |
|  | A + C (50:50) | 0.70 | nef | nef | Nef | nef | nef | nef | nef | nef |
|  | A + C (50:50) | 1.00 | 0.5 | 0.5 | 0.4 | 0.8 | 0.4 | 1.4 | nef | nef |
| 15 | C (100) | 0.50 | nef | nef | Nef | nef | nef | nef | nef | nef |
|  | C (100) | 0.75 | nef | nef | Nef | nef | nef | nef | nef | nef |
|  | C (100) | 1.00 | 1.1 | 1.4* | 4* | 4* | 1.7* | 11* | 2.4* | 2.3* | nef - no antistat effect
* - results which are inconsistent/notreproducible

Example 10, 11 and 12 confirm the findings shown in Table 2 that the comparative antistat compositions show poor performance. Comparative Example 10 showed some performance at a concentration of 1.00%. However, this performance was relatively short lived.

Examples 13 and 14, which are in accordance with the present invention, require a concentration of 1.00% to exhibit any antistat performance. At these levels they showed prolonged performance when compared to comparative Examples 10, 11 and 12.

Example 15 shows that a composition in accordance with the present invention containing components from a common source material, in this case coconut oil, can show an antistat effect.

EXAMPLES 16–20

A homopolymer of propylene (Appryl 3120 MN 1, from the French company Appryl) was evaluated. The results of this evaluation are set out in Table 4 below.

TABLE 4

| Ex. | Component (Ratios) | Antistat Conc. % | Day 1 | Day 3 | Day 7 | Day 14 | Day 28 | Day 56 | Day 112 | Day 224 | Day 448 |
|---|---|---|---|---|---|---|---|---|---|---|---|
| 16 | A + F (60:40) | 0.30 | nef | 2.6* | 0.2* | 0.5 | 0.4 | 0.2 | 0.5* | 0.2* | 0.2 |
|    | A + F (60:40) | 0.40 | 11 | 2.7 | 0.4 | 1.5 | 0.5 | 0.2 | 0.5 | 0.3 | 0.2 |
| 17 | A + F + B (48:32:20) | 0.30 | nef | nef | 1.7 | 0.5 | 0.5 | 0.1 | 0.4 | nef | nef |
|    | A + F + B (48:32:20) | 0.40 | nef | 4* | 2.8* | 0.6 | 0.5 | 0.2* | 0.4* | nef | 0.7* |
| 18 | A + F + G (48:32:20) | 0.30 | nef | 1* | nef | 1.1 | 0.4 | 0.1 | 0.1 | 0.1 | 0.1 |
|    | A + F + G (48:32:20) | 0.40 | nef | 1.6 | 1.5* | 0.3 | 0.2 | 0.1 | 0.1 | 0.1* |  |
| 19 | A(100) | 0.30 | nef | 0.4* | 0.8 | 0.3 | 0.2 | 0.1 | 0.2 | nef | nef |
|    | A(100) | 0.40 | nef | 0.7* | 1.1 | 0.3 | 0.2 | 0.1 | 0.2* | nef | nef |
| 20 | A + G (80:20) | 0.30 | nef | 0.5* | 0.7 | 0.3 | 0.2 | 0.2 | 0.2* | 0.1 | nef |
|    | A + G (80:20) | 0.40 | nef | 0.7 | 0.6 | 0.4 | 0.1 | 0.2 | 0.2 | 0.2 | nef | nef- no antistat effect
* - results which are inconsistent/notreproducible

Comparison of Example 16 with Example 17 shows that a composition in accordance with the present invention, wherein the antistat composition comprises at least two components having different properties, provides an increased/prolonged anti-static effect. This increase/prolongation of anti-static effect is confirmed by comparison of Examples 16 and 17.

Example 19 (comparative) and Example 20 (in accordance with the present invention) confirm that the composition of the present invention is advantageous when incorporated in homopolymer. Both at a concentration of 0.30% and 0.40%, the antistat composition in accordance with the present invention provided an increased/prolonged anti-static effect when compared to the comparative antistat composition.

Modifications of the present invention will be apparent to those skilled in the art Accordingly, having thus described in detail preferred embodiments of the present invention, it is to be understood that the invention defined by the appended claims is not to be limited by particular details set forth in the above description, as many apparent variations thereof are possible without departing from the spirit or scope thereof.

What I claim is:

1. An anti-static composition comprising at least a first component and a second component; wherein the first and second components are integrated;
    wherein the first component inhibits the crystallisation of the second component, wherein at least the second component is an anti-static component; and wherein, when the anti-static composition is used for the manufacture of a polymer composition, the anti-static composition is contacted with the polymer to form the polymer composition; with the proviso that if the anti-static composition consists solely of the first and second components, the anti-static composition is prepared by any one of:
    (i) integrated blending; or
    (ii) dry blending,
    wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof.

2. A polymer composition comprising a polymer and an anti-static composition, wherein the anti-static composition comprises:
    at least 20 wt % of a first component selected from the group consisting of monoglycerides having fatty acid chain length of from 4 to 14 carbons, and
    at least 20 wt % of a second component selected from the group consisting of monoglycerides having a fatty acid chain length of from 16 to 24 carbons;
    with the proviso that if the anti-static composition consists solely of first component and second component II, the anti-static composition is prepared by any one of:
    (a) integrated blending; or
    (b) dry blending.

3. An anti-static composition for the manufacture of a polymer composition, wherein the anti-static composition comprises
    at least 20 wt % of a first component selected from the group consisting of monoglycerides having fatty acid chain length of from 4 to 14 carbons, and
    at least 20 wt % of a second component selected from the group consisting of monoglycerides having a fatty acid chain length of from 16 to 24 carbons;
    with the proviso that if the anti-static composition consists solely of composition I and composition II, the anti-static composition is prepared by any one of:
    (a) integrated blending; or
    (b) dry blending.

4. A method of preparing a polymer composition comprising the steps of (a) providing an anti-static composition comprising
at least 20 wt % of a first component selected from the group consisting of monoglycerides having fatty acid chain length of from 4 to 14 carbons, and
at least 20 wt % of a second component selected from the group consisting of monoglycerides having a fatty acid chain length of from 16 to 24 carbons and
(b) contacting the anti-static composition with a polymer to form a polymer composition;
with the proviso that if the anti-static composition consists solely of composition I and composition II, the anti-static composition is prepared by any one of:
(i) integrated blending; or
(ii) dry blending.

5. The anti-static composition of claim 1 wherein the monoglycerides having a fatty acid chain length of 12 carbons comprise the reaction product of glycerol and lauric acid.

6. The anti-static composition of claim 5, wherein the lauric acid is obtained from coconut oil or palm kernel oil.

7. The anti-static composition of claim 6, wherein the palm kernel oil comprises Babassu oil, Cohune oil, Murumuru oil, Ouricuri oil and Tucum oil.

8. The anti-static composition of claim 1, wherein the animal fats comprise lard or tallow.

9. The anti-static composition of claim 1, wherein the vegetable fats comprise rape seed oil, soybean oil or palm oil.

10. An integrated pellet comprising:
a polymer; and
an integrated anti-static composition comprising at least a first component and a second component; wherein the first and second components are integrated; wherein the first component inhibits the crystallisation of the second component; wherein at least the second component is an anti-static component; and wherein, when the anti-static composition is used for the manufacture of a polymer composition, the anti-static composition is contacted with the polymer to form the polymer composition; with the proviso that if the anti-static composition consists solely of the first and second components, the anti-static composition is prepared by any one of:
(i) integrated blending; or
(ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the animal fats comprise lard or tallow.

11. An integrated pellet comprising:
a polymer; and
an integrated anti-static composition comprising at least a first component and a second component; wherein the first and second components are integrated; wherein the first component inhibits the crystallisation of the second component; wherein at least the second component is an anti-static component; and wherein, when the anti-static composition is used for the manufacture of a polymer composition, the antistatic composition is contacted with the polymer to form the polymer composition; with the proviso that if the anti-static composition consists solely of the first and second components, the anti-static composition is prepared by any one of:
(i) integrated blending; or
(ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides leaving a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof, and wherein the vegetable fats comprise rape seed oil, soybean oil or palm oil.

12. A method of preparing a polymer composition comprising the steps of:
a) providing an anti-static composition comprising at least a first component and a second component; wherein the first and second components are integrated; wherein the first component habits the crystallisation of the second component; and wherein at least the second component is an anti-static component; and
b) contacting the anti-static composition with a polymer to form the polymer composition;
with the proviso that if the anti-static composition consists solely of the first and second components, the anti-static composition is prepared by any one of:
(i) integrated blending; or
(ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the monoglycerides having a fatty acid chain length of 12 carbons comprise the reaction product of glycerol and lauric acid.

13. A method of preparing, a polymer composition comprising the steps of:
a) providing an anti-static composition comprising at least a first component and a second component; wherein the first and second components are integrated; wherein the first component inhibits the crystallisation of the second component; and wherein at least the second component is an anti-static component; and b) contacting the anti-static composition with a polymer to form the polymer composition;

with the proviso that if the anti-static composition consists solely of the first and second components, the anti-static composition is prepared by any one of:

(i) integrated blending; or
(ii) dry blending, wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fat acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and, wherein the animal fats comprise lard or tallow.

14. A method of preparing a polymer composition comprising the steps of:

a) providing an anti-static composition comprising at least a first component and a second component; wherein the first and second components are integrated, wherein the first component inhibits the crystallisation of the second component; and wherein at least the second component is an anti-static component; and b) contacting the anti-static composition with a polymer to form the polymer composition;

with the proviso that if the anti-static composition consists solely of the first and second components, the anti-static composition is prepared by any one of:

(i) integrated blending; or
(ii) dry blending, wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the vegetable fats comprise rape seed oil, soybean oil or palm oil.

15. A method of preparing a polymer composition comprising the steps of a) providing an anti-static composition comprising at least a first component and a second component; wherein the first and second components are integrated; wherein the first or second component inhibits the crystallisation of the other respective component; and wherein at least the other respective component is an anti-static component; and b) contacting the anti-static composition with a polymer to form the polymer composition;

with the proviso that if the anti-static composition consists solely of composition I and composition II, the anti-static composition is prepared by any one of:

(i) integrated blending,; or
(ii) dry blending, wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the monoglycerides having a fatty acid chain length of 12 carbons comprise the reaction product of glycerol and lauric acid.

16. A method of preparing a polymer composition comprising the steps of a) providing an anti-static composition comprising at least a first component and a second component; wherein the first and second components are integrated; wherein the first or second component inhibits the crystallisation of the other respective component; and wherein at least the other respective component is an anti-static component; and b) contacting the anti-static composition with a polymer to form the polymer composition;

with the proviso that if the anti-static composition consists solely of composition I and composition II, the anti-static composition is prepared by any one of:

(i) integrated blending; or
(ii) dry blending, wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the animal fats comprise lard or tallow.

17. A method of preparing a polymer composition comprising the steps of a) providing an anti-static composition comprising at least a first component and a second component; wherein the first and second components are integrated; wherein the first or second component inhibits the crystallisation of the other respective component; and wherein at least the other respective component is an anti-static component; and b) contacting the anti-static composition with a polymer to form the polymer composition:
with the proviso that if the anti-static composition consists solely of composition I and composition II, the anti-static composition is prepared by any one of:
(i) integrated blending; or
(ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the vegetable fats comprise rape seed oil, soybean oil or palm oil.

18. An integrated pellet comprising:
a polymer; and
an integrated anti-static composition comprising at least 20 wt % of a first component selected from the group consisting of monoglycerides having fatty acid chain length of from 4 to 14 carbons, and
at least 20 wt % of a second component selected from the group consisting of monoglycerides heaving a fatty acid chain length of from 16 to 24 carbons;
with the proviso that if the anti-static composition consists solely of composition I and composition II, the anti-static composition is prepared by any one of:
(a) integrated blending; or
(b) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the animal fats comprise lard or tallow.

19. An integrated pellet comprising:
a polymer; and
an integrated anti-static composition comprising at least a first component and a second component; wherein the first and second components are integrated; wherein the first or second component inhibits the crystallisation of the other respective component; wherein at least the other respective component is an anti-static component; and wherein the anti-static composition is contacted with a polymer to form the polymer composition; with the proviso that if the anti-static composition consists solely of composition I and composition II, the anti-static composition is prepared by any one of:
(i) integrated blending; or
(ii) dry blending,
wherein the first and second components are independently selected from the group consisting of monoglycerides having a fatty acid chain length of no greater than 14 carbons monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the animal fats comprise lard or tallow.

20. An integrated pellet comprising a polymer composition comprising:
a polymer; and
an anti-static composition, wherein the anti-static composition comprises at least a first component and a second component; wherein the first and second components are integrated; wherein the first component inhibits the crystallisation of the second component; and wherein at least the second component is an anti-static component; with the proviso that if the anti-static composition consists solely of the first and second components the anti-static composition is prepared by any one of:
(i) integrated blending; or
(ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the animal fats comprise lard or tallow.

21. An integrated pellet comprising a polymer composition comprising:
a polymer; and
an anti-static composition, wherein the anti-static composition comprises: at least 20 wt % of a first component selected from the group consisting of monoglycerides having fatty acid chain length of from 4 to 14 carbons, and at least 20 wt % of a second component selected from the group consisting of monoglycerides having a fatty acid chain length of from 16 to 24 carbons;
with the proviso that if the anti-static composition consists solely of composition I and composition II, the anti-static composition is prepared by any one of:
(a) integrated blending; or
(b) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the animal fats comprise lard tallow.

22. An integrated pellet comprising a polymer composition comprising:
    a polymer; and
    an anti-static composition, wherein the anti-static wherein the anti-static composition comprises at least a first component and a second component; wherein the first and second components are integrated; wherein the first or second component inhibits the crystallisation of the other respective component; and wherein at least the other respective component is an anti-static component; with the proviso that if the anti-static composition consists solely of composition I and composition II the anti-static composition is prepared by any one of:
    (i) integrated blending; or
    (ii) dry blending,
    wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof and wherein the animal fats comprise lard or tallow.

23. An integrated pellet comprising:
    a polymer; and
    an integrated anti-static composition comprising at least 20 wt % of a first component selected from the group consisting of monoglycerides having fatty acid chain length of from 4 to 14 carbons, and
    at least 20 wt % of a second component selected from the group consisting of monoglycerides having a fatty acid chain length of from 16 to 24 carbons,
    with the proviso that if the anti-static composition consists solely of composition I and composition II, the anti-static composition is prepared by any one of:
    (a) integrated blending; or
    (b) dry blending,
    wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the vegetable fats comprise rape seed oil, soybean oil or palm oil.

24. An integrated pellet comprising:
    a polymer; and
    an integrated anti-static composition comprising at least a first component and a second component; wherein the first and second components are integrated; wherein the first or second component inhibits the crystallisation of the other respective component; wherein at least the other respective component is an anti-static component; and wherein the anti-static composition is contacted with a polymer to form the polymer composition;
    with the proviso that if the anti-static composition consists solely of composition I and composition II, the anti-static composition is prepared by any one of:
    (i) integrated blending; or
    (ii) dry blending,
    wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the vegetable fats comprise rape seed oil, soybean oil or palm oil.

25. An integrated pellet comprising a polymer composition comprising a
    polymer; and
    an anti-static composition, wherein the anti-static composition comprises at least a first component and a second component wherein the first and second components are integrated, wherein the first component inhibits the crystallisation of the second component; and wherein at least the second component is an anti-static component, with the proviso that if the anti-static composition consists solely of the first and second components the anti-static composition is prepared by any one of:
    (i) integrated blending; or
    (ii) dry blending,
    wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the vegetable fats comprise rape seed oil, soybean oil or palm oil.

26. An integrated pellet comprising a polymer composition comprising:
   a polymer; and
   an anti-static composition, wherein the antistatic composition comprises at least 20 wt % of a first component selected from the group consisting of monoglycerides having fatty acid chain length of from 4 to 14 carbons, and at least 20 wt % of a second component selected from the group consisting of monoglycerides having a fatty acid chain length of from 16 to 24 carbons;
   with the proviso that if the anti-static composition consists solely of composition I and composition II, the anti-static composition is prepared by any one of:
      (a) integrated blending; or
      (b) dry blending,
wherein the first and second components ate independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the vegetable fats comprise rape seed oil, soybean oil or palm oil.

27. An integrated pellet comprising a polymer composition comprising:
   a polymer; and
   an anti-static composition, wherein the anti-static composition comprises at least a first component and a second component; wherein the first and second components are integrated; wherein the first or second component inhibits the crystallisation of the other respective component; and wherein at least the other respective component is an anti-static component;
   with the proviso that if the anti-static composition consists solely of composition I and composition II the anti-static composition is prepared by any one of:
      (i) integrated blending; or
      (ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the vegetable fats comprise rape seed oil, soybean oil or palm oil.

28. An integrated pellet comprising:
   a polymer; and
   an integrated anti-static composition, wherein the anti-static composition comprises at least a first component and a second component; wherein the first and second components are integrated; wherein the first component inhibits the crystallisation of the second component; wherein at least the second component is an anti-static component; and wherein the anti-static composition is contacted with a polymer to form the polymer composition; with the proviso that if the anti-static composition consists solely of the first and second components, the anti-static composition is prepared by any one of:
      (i) integrated blending, or
      (ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the monoglycerides having a fatty acid chain length of 12 carbons comprise the reaction product of glycerol and lauric acid.

29. An integrated pellet comprising:
   a polymer, and
   an integrated anti-static composition, wherein the anti-static composition comprises at least 20 wt % of a first component selected from the group consisting of monoglycerides having fatty acid chain length of from 4 to 14 carbons, and at least 20 wt % of a second component selected from the group consisting of monoglycerides having a fatty acid chain length of from 16 to 24 carbons;
   with the proviso that if the anti-static composition consists solely of composition I and composition II, the anti-static composition is prepared by any one of:
      (a) integrated blending; or
      (b) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the monoglycerides having a fatty acid chain length of 12 carbons comprise the reaction product of glycerol and lauric acid.

30. An integrated pellet comprising:
   a polymer; and
   an integrated anti-static composition, wherein the anti-static composition comprises at least a first component and a second component; wherein the first and second components are integrated; wherein the first or second component inhibits the crystallisation of the other respective component; wherein at least the other respective component is an anti-static component; and wherein the ant-static composition is contacted with a polymer to form the polymer composition; with the proviso that if the anti-static composition consists solely of composition I and composition II, the anti-static composition is prepared by any one of:
      (i) integrated blending; or
      (ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the monoglycerides having a fatty acid chain length of 12 carbons comprise the reaction product of glycerol and lauric acid.

31. An integrated pellet comprising a polymer composition comprising:
   a polymer; and
   an anti-static composition, wherein the anti-static composition comprises at least a first component and a second component; wherein the first and second components are integrated; wherein the first component inhibits the crystallisation of the second component; and wherein at least the second component is an anti-static component; with the proviso that if the anti-static composition consists solely of the first and second components the anti-static composition is prepared by any one of:
      (i) integrated blending; or
      (ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and fixtures thereof; and wherein the monoglycerides having a fatty acid chain length of 12 carbons comprise the reaction product of glycerol and lauric acid.

32. An integrated pellet comprising a polymer composition comprising:
   a polymer; and
   an anti-static composition, wherein the anti-static composition comprises: at least 20 wt % of a first component selected from the group consisting of monoglycerides having fatty acid chain length of from 4 to 14 carbons, and at least 20 wt % of a second component selected from the group consisting of monoglycerides having a fatty acid chain length of from 16 to 24 carbons;
   with the proviso that if the anti-static composition consists solely of composition I and composition II, the anti-static composition is prepared by any one of:
      (a) integrated blending; or
      (b) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the monoglycerides having a fatty acid chain length of 12 carbons comprise the reaction product of glycerol and lauric acid.

33. An integrated pellet comprising a polymer composition comprising;
   a polymer; and
   an anti-static composition, wherein the anti-static composition comprises at least a first component and a second component; wherein the first and second components are integrated; wherein the first or second component inhibits the crystallisation of the other respective component; and wherein at least the other respective component is an anti-static component; with the proviso that if the anti-static composition consists solely of composition I and composition II the anti-static composition is prepared by any one of:
      (i) integrated blending; or
      (ii) dry blending,
wherein the first and second components are independently selected from the group consisting of monoglycerides having a fatty acid chain length of no greater than 14 carbons, monoglycerides having a fatty acid chain length of from 4 to 14 carbons, monoglycerides having a fatty acid chain length of from 6 to 14 carbons, monoglycerides having a fatty acid chain length of from 8 to 14 carbons, monoglycerides having a fatty acid chain length of from 10 to 14 carbons, monoglycerides having a fatty acid chain length of 12 carbons, monoglycerides having a fatty acid chain length of from 16 to 24 carbons, monoglycerides having a fatty acid chain length of from 16 to 22 carbons, monoglycerides having a fatty acid chain length of from 18 to 22 carbons, monoglycerides having a fatty acid chain length of from 18 to 20 carbons, animal fats, vegetable fats, and mixtures thereof; and wherein the monoglycerides having a fatty acid chain length of 12 carbons comprise the reaction product of glycerol and lauric acid.

34. The invention of any one of claims 28–33, wherein the monoglycerides having a fatty acid chain length of 12 carbons comprise the reaction product of glycerol and lauric acid.

35. The invention of claim 34, wherein the lauric acid is obtained from coconut oil or palm kernel oil.

36. The invention of claim 35, wherein the palm kernel oil comprises Babassu oil, Cohune oil, Murumuru oil and Tucum oil.

* * * * *